Sept. 9, 1969         G. BERNARD ET AL         3,466,541
           VOLTAGE MEASURING APPARATUS UTILIZING
                ELECTRO-OPTICAL COMPONENTS
Filed March 10, 1967                    2 Sheets-Sheet 1

INVENTORS:
GEORGES BERNARD &
YVES PELENC

Arthur Schwartz
ATTORNEY

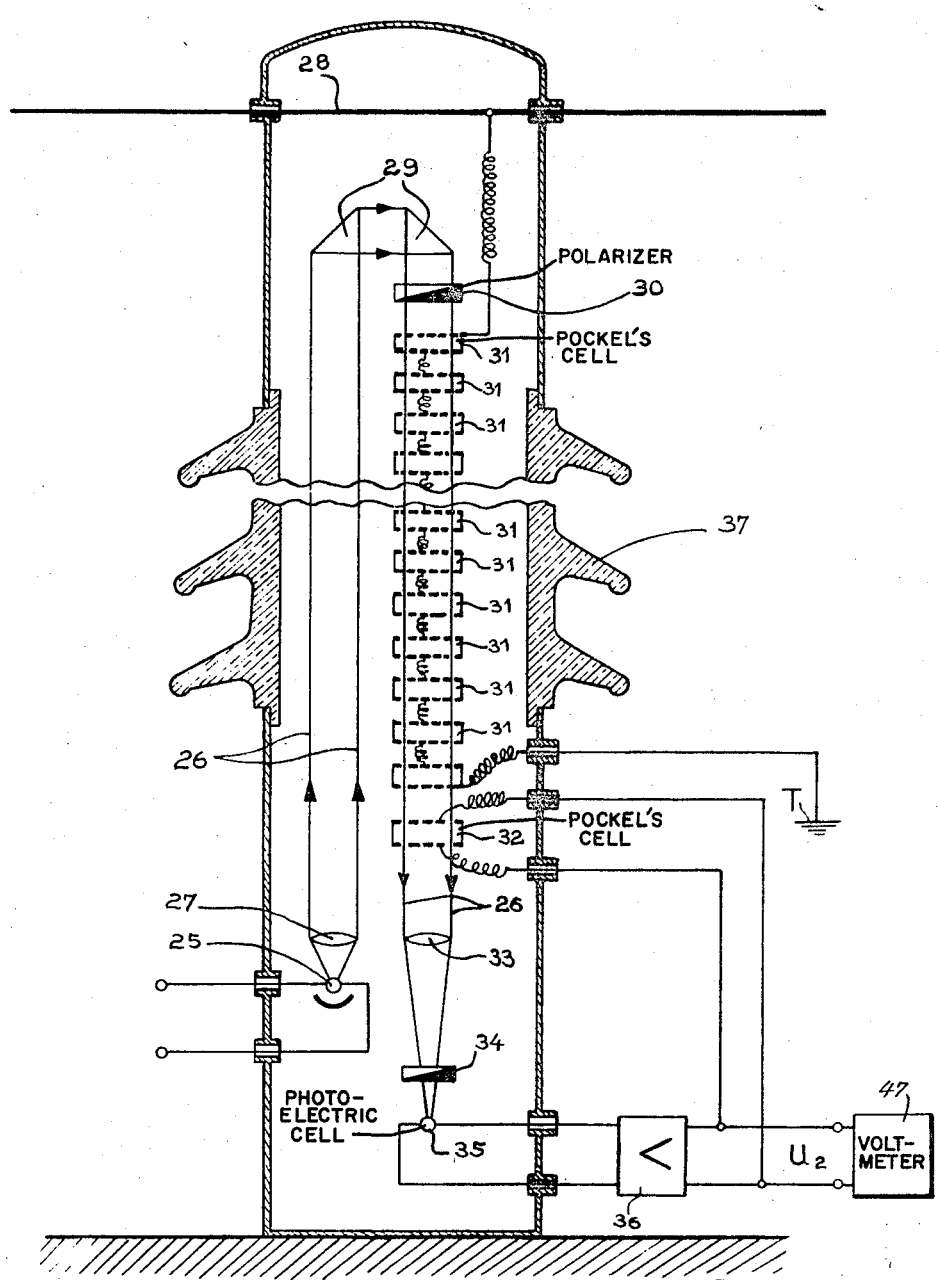
Fig: 3

United States Patent Office 3,466,541
Patented Sept. 9, 1969

3,466,541
VOLTAGE MEASURING APPARATUS UTILIZING ELECTRO-OPTICAL COMPONENTS
Georges Bernard, La Tronche, and Yves Pelenc, St. Egreve, France, assignors to Merlin Gerin Societe Anonyme, Grenoble, France
Filed Mar. 10, 1967, Ser. No. 622,275
Claims priority, application France, Mar. 16, 1966, 4,896
Int. Cl. G01r 31/02
U.S. Cl. 324—96                                8 Claims

ABSTRACT OF THE DISCLOSURE

A voltage measuring apparatus utilizing electro-optical components for the measurement of the voltage of an aerial high-voltage conductor. A polarized light beam traverses an electro-optical device composed of a medium rendered birefringent under the influence and as a function of an electric field in said medium. A plurality of electric field producing means is series connected between the high-voltage conductor and earth. The modulated flux of the light beam emerging from said medium is measured.

---

In high-voltage networks, voltage step-down transformers and capacitive dividers are generally used, to measure the voltage. These devices present a number of difficulties relating to the insulation and to the potential distribution and require complicated measures to lower the Corona point. Moreover, the transient response of these instruments is poor and they do not allow measurement at low frequencies or direct current.

It is an object of the invention to produce a voltage divider which does not present the above mentioned drawbacks.

This and other objects and advantages will be apparent from the following description when read in conjunction with the drawings in which:

FIGURE 3 is a cross section of a multiple cell device, according to the invention.

In order to measure voltage, electro-optical devices have already been proposed, using the Kerr and the Pockels' effects. In both these effects, an electrically influenced double refraction or birefringence occurs in certain medium on which an electric field is applied. The birefringence related to the Kerr effect may be observed in liquids such as nitrobenzene and in a certain number of gases, when an electric field is applied perpendicularly to the direction of a polarized light beam. As a result, the polarization of the beam undergoes a change and the light beam generally becomes elliptic. The Pockels' effect appears in a suitable crystal (ZnS or $KH_2PO_4$, for example), located in an electric field the direction of which is preferably parallel with the propagation of the light beam. By means of adequately inserted polarizers and by introducing, if necessary, a quarter wave element, one can obtain variations in the modulated light flux received by a photo-electric cell proportional to the variations of the voltage applied to two plates or parallel grids between which the birefringent medium is located.

Figure 1:
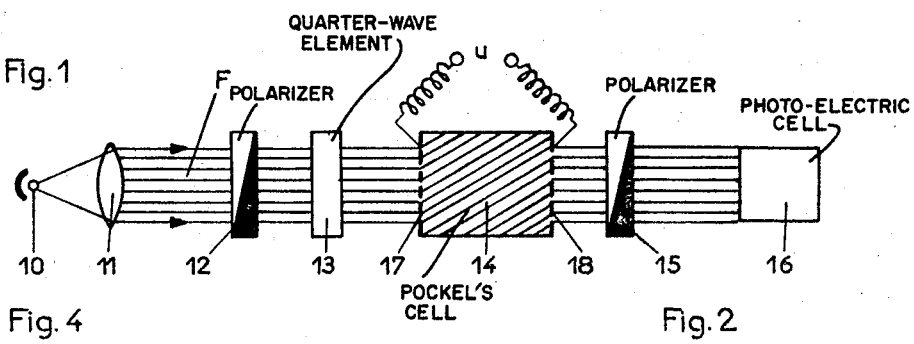
FIGURE 1 is a diagram illustrating the basic concept of the invention using a Pockels cell.
Figure 2:
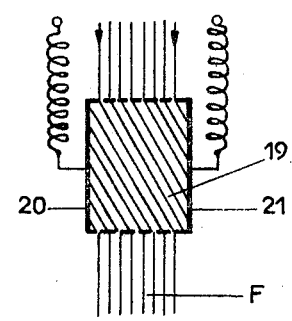
FIGURE 2 is a modification of the system of FIGURE 1 using Kerr's cells.

Such a device, based on the Pockels' effect, is diagrammatically represented on FIG. 1. Source 10 produces a light beam F, passing successively through an optical system 11, a polarizer or Nicol 12, a quarter wave element 13, a Pockels' cell with suitable cristal 14, and a second polarizer or analyzer 15, to finally influence photoelectric cell 16. The voltage to be measured is applied to grids 17, 18 of the cell 14 and the electrical output signal given by photo-electric cell 16 is a measure of the voltage applied to the cell. Pockels' cell 14 may be replaced by Kerr's cell 19 (FIG. 2), comprising a container filled with a suitable liquid. In this case the voltage to be measured is applied to plates 20, 21 and is measured in a way similar to that described above.

A description of the measuring procedure does not seem to be necessary as it is common knowledge among the specialists. The Pockels' effect is generally preferred for the purpose of measuring voltage as this effect is proportional to the potential differences, while the Kerr effect is quadratic proportional to the electric field.

Unfortunately, Kerr's and Pockels' cells cannot directly be used to measure high electric voltage.

The purpose of the present invention is to measure very high voltages by means of voltage dividers based on the electro-optical effects already described.

An advantage of the electro-optical voltage divider according to the invention is that a uniform potential distribution along the cells is not required and that information of low frequencies, particularly at direct current, may be transmitted. By properly selecting the size and number of the cells and series impedances and their disposition in space it is possible to obtain a sampling of the light flux modulating electric fields along the column of cells so that the high-voltage can be measured with great precision even if the potential distribution along the column is not uniform.

A smaller number of cells can be used by inserting the cells in a series of capacitors forming a potential dividing device. The capacitors may be small capacity condensers.

The light source of the photo-electric or photomultiplier cell and of the associated electric means may result in errors affecting the measurements.

According to an improvement of the invention, such errors are eliminated by inserting an additional compensating cell, traversed by the light beam.

FIG. 3 illustrates a voltage divider comprising a plurality of Pockels' cells used for measuring a high-voltage. A light source 25 produces a visible, infrared or ultraviolet radiation beam 26, and all such radiation is herein referred to as light. The measuring instrument and the light source are preferably located on the same side at a potential equal or near the ground potential. The light beam 26, produced by source 25, passes through an optical system 27 directing it towards a high-voltage conductor 28 of voltage $U_1$ to be measured. An optical prism system 29 reflects the light beam 26 towards a polarizer 30, which may be alternately located between lens 27 and prism 29. The light beam 26 then penetrates a large number of spaced Pockels' cells 31 whose birefringence is identical.

The grids or electrodes of the Pockels' cells are connected to the grids of the adjacent cells in such a way that all cells are electrically connected in series, the end grids being connected respectively to conductor 28 and to the earth T. At the bottom of the column of cells 31, an additional compensating Pockels' cell 32 is inserted through which passes the light beam 26.

The compensating cell 32 is adapted and electrically connected so as to tend to compensate at any moment the birefringence resulting from the preceedings cells mounted in series. After passing through cell 32, the beam follows its course through an optical system 33 and an analyzer 34 to reach finally a photo-electric cell 35, connected to the input of an amplifier 36.

A measuring instrument 47 measures the voltage $U_2$ at the output of the amplifier 36, said voltage $U_2$ being also adequately applied to the grids of the compensating cell 32 tending to reduce to zero at any moment the birefringence occurring in all the $n$ primary cells 31. To this end the compensating cell 32 should comprise a medium which is $n$ times more refractive than that of the $n$ primary cells 31.

Photo-electric cell 35 transmits to the amplifier at any moment a differential signal. Thus, the unit constitutes a real voltage transformer, the secondary voltage of which being equal to: $U_1/K$, K being a constant and which is able to transmit low frequency or direct current information. The whole apparatus can be placed in a hollow insulator. It may be advantageous to replace the compensation Pockels' cell 32 by a Faraday effect magneto-optical cell.

In order that the result be not affected by disturbances due for instance to variations in the light flux produced by the source (due to a prolonged use of the lamp, fluctuations in the supply voltage etc.), it may be useful to split the light beam proceeding from cell 27 into two polarized beams by means of semi-reflecting separator, illuminating respectively two photo-electric cells which form a part of a balanced compensating system. Further particulars concerning such a system are given in French Patent No. 1,439,260 and in the first patent of addition No. 51,961 to this patent.

According to the invention, the Pockels' cell may be replaced by a column of Kerr's cells electrically connected in series. In that case, however, the compensating cell 32 must also be replaced by a Kerr's cell.

Figure 4:
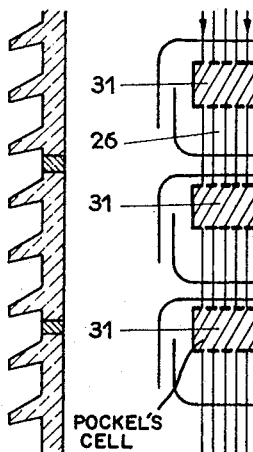
FIGURE 4 shows the inter-cell connections using Pockels cells.
Figure 5:
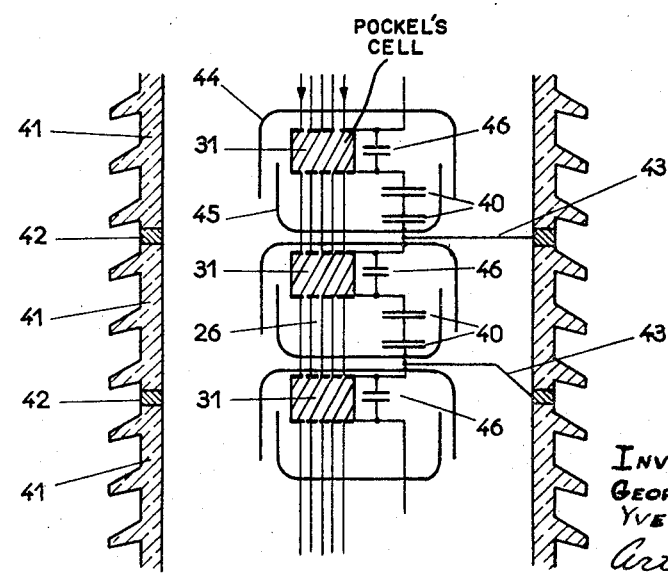
FIGURE 5 shows the inter-cell connections using other impedance devices.

FIG. 4 and 5 show a diagram of the column formed by the Pockels' cells 31 electrically connected in series either by means of resistors 38 or condensers 40.

FIG. 4 and 5 only show a fragment of the column formed by the cells. All the cells are preferably inserted in an hollow insulator (FIG. 5), formed by a column of several insulators 41 interconnected by metallic elements 42.

These elements 42 may be themselves electrically connected by conductors 43 to appropriately selected points of the series circuit of the cells and impedancies.

Each cell 31 may be located, eventually together with the condensers 40 or the resistors 38 in an enclosure comprising two bell-shaped electrodes 44, 45, this enclosure surrounding the cell in order to constitute an electrostatic screen. The cells 31 may be shunted by other resistors 39 (FIG. 4) or condensers 46 (FIG. 5).

What is claimed is:

1. In an electro-optical voltage measuring apparatus for the measurement of the voltage of an aerial high-voltage conductor, in combination, a light source emitting a light beam, polarizing means to polarize said light beam, a plurality of electro-optical devices having a medium rendered birefringent under the influence of and as a function of an electric field, and means to produce said electric field in said medium, said electro-optical devices spaced apart between said high-voltage conductor and the earth so as to be successively traversed by said polarized light beam, said electric field producing means of said electro-optical devices being connected in series between said high-voltage conductor and a low-potential conductor, and detecting means to measure the modulated light flux of the beam emerging from said plurality of electro-optical devices.

2. An electro-optical voltage measuring apparatus as set forth in claim 1, in which said low potential conductor is at earth potential.

3. An electro-optical voltage measuring apparatus as set forth in claim 1, further comprising a plurality of potential dividing impedances connected between said electric field producing means of adjacent electro-optical devices.

4. An electro-optical voltage measuring apparatus as set forth in claim 1, further comprising a plurality of aligned and superposed hollow insulators surrounding said electro-optical devices, metallic junction elements being disposed between adjacent insulators, said junction elements being connected to said electric field producing means of said electro-optical devices.

5. An electro-optical voltage measuring apparatus as set forth in claim 1, further comprising electro-static screen means surrounding at least a part of said electro-optical devices to improve the potential distribution along said plurality of electro-optical devices.

6. An electro-optical voltage measuring apparatus as set forth in claim 1, wherein said detecting means comprise a further electro-optical device having a medium rendered birefringent under the influence and as a function of an electric field, said further electro-optical device being disposed to be traversed by the light beam emerging from said plurality of electro-optical devices, means being provided to produce an electric field in said medium of said further electro-optical device so as to compensate by a null method the resulting modulation of said light flux produced by said plurality of electro-optical devices.

7. An electro-optical voltage measuring apparatus as set forth in claim 1, wherein said electro-optical devices comprise a plurality of Pockels' cells and wherein said detecting means comprise a magneto-optical Faraday's effect compensation cell being disposed to be traversed by the light beam emerging from said plurality of electro-optical devices, means being provided to produce a magnetic field in said magneto-optical cell so as to compensate by a null method the resulting modulation of said light flux produced by said plurality of electro-optical devices.

8. An electro-optical voltage measuring apparatus as set forth in claim 1, wherein said electro-optical devices comprise a plurality of Kerr's cells.

References Cited

UNITED STATES PATENTS

| 3,312,895 | 4/1967 | Garbuny | 324—96 |
| 3,324,393 | 6/1967 | Casey et al. | 324—96 |
| 3,363,174 | 1/1968 | Hudson et al. | 324—96 |

RUDOLPH V. ROLINEC, Primary Examiner

C. F. ROBERTS, Assistant Examiner

U.S. Cl. X.R.

88—14; 250—225, 199; 340—189